(12) United States Patent
Calesella et al.

(10) Patent No.: US 10,893,579 B2
(45) Date of Patent: Jan. 12, 2021

(54) METHOD FOR OPERATING AN INDUCTION COOKING HOB AND COOKING HOB USING SUCH METHOD

(71) Applicant: WHIRLPOOL CORPORATION, Benton Harbor, MI (US)

(72) Inventors: Carlo Calesella, Castelmassa (IT); Andrea Gallivanoni, Casorate Sempione (IT); Davide Parachini, Cassano Magnago (IT); Cristiano Vito Pastore, Camerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 246 days.

(21) Appl. No.: 16/037,626

(22) Filed: Jul. 17, 2018

(65) Prior Publication Data

US 2019/0029079 A1    Jan. 24, 2019

(30) Foreign Application Priority Data

Jul. 18, 2017   (EP) .................................... 17181987

(51) Int. Cl.
*H05B 6/06*   (2006.01)
*H05B 6/04*   (2006.01)
*H05B 6/12*   (2006.01)

(52) U.S. Cl.
CPC .......... *H05B 6/065* (2013.01); *H05B 6/1272* (2013.01); *H05B 2206/02* (2013.01); *H05B 2213/03* (2013.01)

(58) Field of Classification Search
CPC .. H05B 6/1272; H05B 6/065; H05B 2213/03; H05B 2206/02

USPC ................ 219/621, 620, 624, 626, 660–663, 219/665–669, 670–672; 363/21, 26, 41, 363/49, 97; 700/300
See application file for complete search history.

(56) References Cited

U.S. PATENT DOCUMENTS

| 3,259,837 A | 7/1966 | Oshry |
| 3,814,888 A | 6/1974 | Bowers et al. |
| 4,029,926 A | 6/1977 | Austin |
| 4,220,839 A | 9/1980 | De Leon |
| 4,356,371 A | 10/1982 | Kiuchi et al. |

(Continued)

FOREIGN PATENT DOCUMENTS

| CN | 102396294 A | 3/2012 |
| CN | 103596307 A | 2/2014 |

(Continued)

OTHER PUBLICATIONS

Sarnago et al, "Multiple-Output ZCS Resonant Inverter for Multi-Coil Induction Heating Appliances," IEEE 2017, pp. 2234-2238.

(Continued)

*Primary Examiner* — Quang T Van
(74) *Attorney, Agent, or Firm* — Price Heneveld LLP (57) ABSTRACT

A method for operating an induction cooking hob including a plurality of inductors in association with induction resonant inverters operating in load-dependent frequency ranges includes a simultaneous activation of inductors, in at least one phase of the control period, independently from their association to one or more overlying cooking utensils but only according to at least partial overlapping of associated operating frequency ranges.

17 Claims, 4 Drawing Sheets

(56) References Cited

U.S. PATENT DOCUMENTS

| | | |
|---|---|---|
| 4,415,788 A | 11/1983 | Field |
| 4,431,892 A | 2/1984 | White |
| 4,438,311 A | 3/1984 | Tazima et al. |
| 4,476,946 A | 10/1984 | Smith |
| 4,540,866 A | 9/1985 | Okuda |
| 4,629,843 A | 12/1986 | Kato et al. |
| 4,695,770 A | 9/1987 | Raets |
| 4,713,528 A | 12/1987 | Grata |
| 4,776,980 A | 10/1988 | Ruffini |
| 4,810,847 A | 3/1989 | Ito |
| 4,820,891 A | 4/1989 | Tanaka et al. |
| 5,190,026 A | 3/1993 | Doty |
| 5,523,631 A | 6/1996 | Fishman et al. |
| 5,571,438 A | 11/1996 | Izaki et al. |
| 5,640,497 A | 6/1997 | Woolbright |
| 5,665,263 A | 9/1997 | Gaspard |
| 5,686,006 A | 11/1997 | Gaspard |
| 5,808,280 A | 9/1998 | Gaspard |
| 5,866,884 A | 2/1999 | Cornec et al. |
| 6,018,154 A | 1/2000 | Izaki et al. |
| 6,078,033 A | 6/2000 | Bowers et al. |
| 6,230,137 B1 | 5/2001 | Has et al. |
| 6,693,262 B2 | 2/2004 | Gerola et al. |
| 6,696,770 B2 | 2/2004 | Nadot et al. |
| 6,764,277 B2 | 7/2004 | Somahara et al. |
| 7,021,895 B2 | 4/2006 | Rubenstein et al. |
| 7,023,246 B2 | 4/2006 | Scollo et al. |
| 7,049,563 B2 | 5/2006 | Keishima et al. |
| 7,053,678 B2 | 5/2006 | Scollo et al. |
| 7,057,144 B2 | 6/2006 | Hirota et al. |
| 7,274,008 B2 | 9/2007 | Amal Valero et al. |
| 7,306,429 B2 | 12/2007 | Horng et al. |
| 7,390,994 B2 | 6/2008 | Oh et al. |
| 7,429,021 B2 | 9/2008 | Sather et al. |
| 7,504,607 B2 | 3/2009 | Barragan Perez et al. |
| 7,709,732 B2 | 5/2010 | Phillips |
| 7,759,616 B2 | 7/2010 | Gouardo et al. |
| 7,777,163 B2 | 8/2010 | Hosoi et al. |
| 7,786,414 B2 | 8/2010 | Schilling et al. |
| 7,910,865 B2 | 3/2011 | Haag et al. |
| 7,982,570 B2 | 7/2011 | Burdick, Jr. et al. |
| 8,017,864 B2 | 9/2011 | Phillips |
| 8,248,145 B2 | 8/2012 | Melanson |
| 8,263,916 B2 | 9/2012 | Fujita et al. |
| 8,350,194 B2 | 1/2013 | Lee et al. |
| 8,356,367 B2 | 1/2013 | Flynn |
| 8,431,875 B2 | 4/2013 | Gutierrez |
| 8,440,944 B2 | 5/2013 | Acero Acero et al. |
| 8,558,148 B2 | 10/2013 | Artigas Maestre et al. |
| 8,618,778 B2 | 12/2013 | Gray et al. |
| 8,658,950 B2 | 2/2014 | Cho et al. |
| 8,723,089 B2 | 5/2014 | Sadakata et al. |
| 8,742,299 B2 | 6/2014 | Gouardo et al. |
| 8,754,351 B2 | 6/2014 | England et al. |
| 8,791,398 B2 | 7/2014 | De la Cuerda Ortin et al. |
| 8,817,506 B2 | 8/2014 | Shimomugi et al. |
| 8,853,991 B2 | 10/2014 | Shan et al. |
| 8,878,108 B2 | 11/2014 | Kitaizumi et al. |
| 8,901,466 B2 | 12/2014 | Schilling et al. |
| 8,912,473 B2 | 12/2014 | Roux |
| 8,975,931 B2 | 3/2015 | Koehler |
| 9,006,621 B2 | 4/2015 | Artal Lahoz et al. |
| 9,060,389 B2 | 6/2015 | Lee et al. |
| 9,084,295 B2 | 7/2015 | Sadakata et al. |
| 9,113,502 B2 | 8/2015 | Falcon et al. |
| 9,198,233 B2 | 11/2015 | Brosnan et al. |
| 9,269,133 B2 | 2/2016 | Cho et al. |
| 9,277,598 B2 | 3/2016 | Lee et al. |
| 9,282,593 B2 | 3/2016 | Brosnan et al. |
| 9,326,329 B2 | 4/2016 | Kitaizumi et al. |
| 9,347,672 B2 | 5/2016 | Jungbauer et al. |
| 9,356,383 B2 | 5/2016 | Waffenschmidt et al. |
| 9,370,051 B2 | 6/2016 | Fossati et al. |
| 9,374,851 B2 | 6/2016 | Klein et al. |
| 9,400,115 B2 | 7/2016 | Kuwamura |
| 9,491,809 B2 | 11/2016 | Shaffer et al. |
| 9,554,425 B2 | 1/2017 | Sawada et al. |
| 9,603,202 B2 | 3/2017 | Shaw |
| 9,609,697 B2 | 3/2017 | Aldana Arjol et al. |
| 9,622,296 B2 | 4/2017 | Dehnert et al. |
| 2003/0004647 A1 | 1/2003 | Sinclair |
| 2003/0163326 A1 | 8/2003 | Maase |
| 2005/0002784 A1 | 1/2005 | Li et al. |
| 2006/0289489 A1 | 12/2006 | Wang |
| 2007/0246458 A1 | 10/2007 | Seok et al. |
| 2009/0020526 A1 | 1/2009 | Roux |
| 2009/0084777 A1 | 4/2009 | Oh et al. |
| 2009/0321424 A1 | 12/2009 | Magdalena et al. |
| 2010/0044367 A1 | 2/2010 | Kim et al. |
| 2010/0163546 A1 | 7/2010 | Nanno et al. |
| 2010/0182136 A1 | 7/2010 | Pryor |
| 2011/0084058 A1 | 4/2011 | Kim et al. |
| 2011/0155200 A1 | 6/2011 | Simka |
| 2011/0240632 A1 | 10/2011 | Falcon et al. |
| 2011/0272397 A1 | 11/2011 | Lahoz et al. |
| 2011/0303653 A1 | 12/2011 | Chun et al. |
| 2012/0024835 A1 | 2/2012 | Artal Lahoz et al. |
| 2012/0024842 A1 | 2/2012 | Thomann et al. |
| 2012/0043312 A1* | 2/2012 | Lee .............. H05B 6/062 219/622 |
| 2012/0223070 A1 | 9/2012 | Matsui et al. |
| 2012/0248098 A1 | 10/2012 | Lee et al. |
| 2012/0261405 A1 | 10/2012 | Kurose et al. |
| 2012/0321762 A1 | 12/2012 | Aranda Vazquez et al. |
| 2013/0334210 A1 | 12/2013 | Takehira et al. |
| 2014/0305928 A1 | 10/2014 | Thompson et al. |
| 2015/0245417 A1 | 8/2015 | Fattorini et al. |
| 2015/0341990 A1 | 11/2015 | Nagata et al. |
| 2016/0037584 A1 | 2/2016 | Viroli et al. |
| 2016/0037589 A1 | 2/2016 | Altamura et al. |
| 2016/0135255 A1 | 5/2016 | Ogawa et al. |
| 2016/0234889 A1 | 8/2016 | Vazquez et al. |
| 2016/0330799 A1 | 11/2016 | Leyh et al. |
| 2016/0381735 A1 | 12/2016 | Christiansen et al. |
| 2016/9381736 A1 | 12/2016 | Christiansen et al. |
| 2017/0055318 A1 | 2/2017 | Franco Gutierrez et al. |
| 2017/0105251 A1 | 4/2017 | Viroli et al. |
| 2017/0142783 A1 | 5/2017 | Herzog et al. |
| 2017/0181229 A1 | 6/2017 | Lomp et al. |

FOREIGN PATENT DOCUMENTS

| | | |
|---|---|---|
| DE | 7242625 U | 3/1973 |
| DE | 3909125 A1 | 9/1990 |
| DE | 4228076 C1 | 8/1993 |
| DE | 19907596 A1 | 8/2000 |
| DE | 102004009606 A1 | 9/2005 |
| DE | 102007032757 A1 | 2/2008 |
| DE | 102007037881 A1 | 1/2009 |
| DE | 202009000990 U1 | 4/2009 |
| DE | 102010028549 A1 | 11/2010 |
| DE | 112008002807 B4 | 9/2013 |
| DE | 102013206340 A1 | 10/2014 |
| DE | 102014105161 A1 | 10/2015 |
| DE | 102015220788 A1 | 6/2016 |
| DE | 102015220795 A1 | 6/2016 |
| EP | 0498735 A1 | 8/1992 |
| EP | 0722261 A1 | 12/1995 |
| EP | 0713350 A1 | 5/1996 |
| EP | 1137324 A1 | 9/2001 |
| EP | 1629698 B1 | 5/2003 |
| EP | 1505350 A2 | 2/2005 |
| EP | 1610590 A1 | 12/2005 |
| EP | 0926926 B1 | 11/2006 |
| EP | 1455453 B1 | 9/2007 |
| EP | 2095686 B1 | 11/2007 |
| EP | 1951003 A1 | 7/2008 |
| EP | 2352359 B1 | 1/2009 |
| EP | 2252130 B1 | 3/2009 |
| EP | 2070442 A2 | 6/2009 |
| EP | 1575336 B1 | 1/2010 |
| EP | 2642820 A1 | 11/2010 |
| EP | 2120508 B1 | 12/2010 |
| EP | 2306784 A1 | 4/2011 |

(56) References Cited

FOREIGN PATENT DOCUMENTS

| | | |
|---|---|---|
| EP | 2506662 A1 | 10/2012 |
| EP | 2506674 A1 | 10/2012 |
| EP | 2615376 A1 | 7/2013 |
| EP | 2048914 B1 | 10/2013 |
| EP | 2744299 A1 | 6/2014 |
| EP | 2775785 A1 | 9/2014 |
| EP | 2211591 B2 | 10/2014 |
| EP | 1931177 B1 | 5/2015 |
| EP | 2034799 B1 | 5/2015 |
| EP | 2034800 B1 | 5/2015 |
| EP | 2204072 B1 | 7/2015 |
| EP | 2731402 B1 | 8/2015 |
| EP | 2975289 A2 | 1/2016 |
| EP | 1303168 B1 | 3/2016 |
| EP | 2445309 B1 | 5/2016 |
| EP | 2525485 B1 | 7/2016 |
| EP | 2543232 B1 | 7/2016 |
| EP | 2838316 B1 | 10/2016 |
| EP | 2427032 B1 | 12/2016 |
| EP | 2914059 B1 | 12/2016 |
| EP | 2469972 | 5/2017 |
| EP | 3170363 A1 | 5/2017 |
| EP | 3042541 B1 | 6/2017 |
| EP | 2416621 B1 | 7/2017 |
| EP | 3030042 B1 | 8/2017 |
| EP | 3139702 A1 | 8/2017 |
| EP | 3079443 B1 | 11/2017 |
| ES | 2201937 A1 | 3/2004 |
| ES | 2310962 A1 | 1/2009 |
| ES | 2328540 B1 | 9/2010 |
| ES | 2340900 B1 | 5/2011 |
| ES | 2362523 B1 | 8/2012 |
| FR | 2659725 A1 | 9/1991 |
| FR | 2712071 A1 | 5/1995 |
| FR | 2863039 A1 | 6/2005 |
| FR | 2965446 A1 | 3/2012 |
| GB | 2048025 B | 1/1983 |
| JP | H07211443 A | 8/1995 |
| JP | H07211444 A | 8/1995 |
| JP | H08187168 A | 7/1996 |
| JP | 2001196156 A | 7/2001 |
| JP | 3225240 B2 | 11/2001 |
| JP | 2008153046 A | 7/2008 |
| JP | 2009117378 A | 5/2009 |
| JP | 2009158225 A | 7/2009 |
| JP | 4932548 B2 | 5/2012 |
| KR | 20170019888 A | 2/2017 |
| WO | 9737515 A1 | 10/1997 |
| WO | 2005069688 A2 | 7/2005 |
| WO | 2008031714 A1 | 3/2008 |
| WO | 2008122495 A1 | 10/2008 |
| WO | 2009016124 A1 | 2/2009 |
| WO | 2009049989 A1 | 4/2009 |
| WO | 2009053279 A1 | 4/2009 |
| WO | 2010101135 A1 | 9/2010 |
| WO | 2011128799 A1 | 10/2011 |
| WO | 2011148289 A2 | 12/2011 |
| WO | 2012104327 A1 | 8/2012 |
| WO | 2014156010 A1 | 10/2014 |
| WO | 2016010492 A1 | 1/2016 |
| WO | 2016015971 A1 | 2/2016 |
| WO | 2016071803 A1 | 5/2016 |
| WO | 2016087297 A1 | 6/2016 |
| WO | 2016134779 A1 | 9/2016 |
| WO | 2017109609 A1 | 6/2017 |
| WO | 2017115334 A1 | 7/2017 |

OTHER PUBLICATIONS

Sarnago et al, "Modulation Scheme for Improved Operation of an RB-IGBT-Based Resonant Inverter Applied to Domestic Induction Heating," IEEE Transactions on Industrial Electronics, vol. 60, No. 5, May 2013, pp. 2066-2073.

* cited by examiner

METHOD FOR OPERATING AN INDUCTION COOKING HOB AND COOKING HOB USING SUCH METHOD

CROSS-REFERENCE TO RELATED APPLICATION

The present application claims priority to European Patent Application No. 17181987.3, entitled METHOD FOR OPERATING AN INDUCTION COOKING HOB AND COOKING HOB USING SUCH METHOD, which was filed on Jul. 18, 2017, the entire contents of which are hereby incorporated by reference.

BACKGROUND

The present invention relates to a method for operating an induction cooking hob comprising a plurality of inductors in association with induction inverters supplied by a common rectifying circuit so that a multi-zone induction cooking hob is provided. In addition the present invention relates to an induction cooking hob as well, comprising a plurality of inductors each preferably connected or connectable with an induction resonant inverter and preferably supplied by a common rectifying circuit so that a multi-zone induction cooking hob and a control system for driving said resonant inverters is provided.

Figure 1:
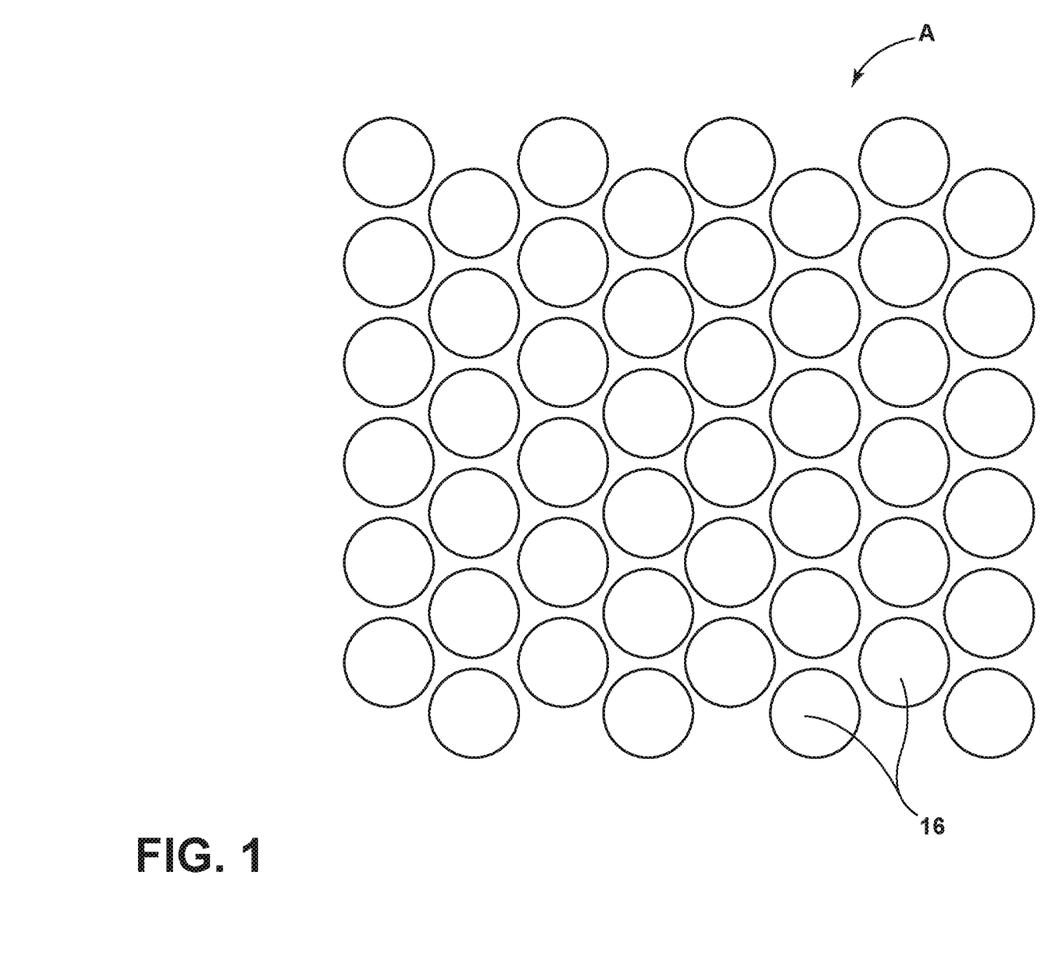
FIG. 1 is a top view of a typical inductor coil organization in a flexible induction cooktop.

Such kind of cooking hob is disclosed by EP 2252130, and it is also known as "flexible induction cooktop" or "induction cookanywhere", which is characterized by having a large number of induction coils, typically larger in number than 12, and whose dimensions are typically smaller than the size of the cooking vessel and these coils are distributed next to each other to form a bi-dimensional array A (as shown in FIG. 1).

One known drawback of induction cooking hobs of the above type is the need of supplying and controlling a large number of induction coils with respect to the typical 3 to 6 coils, which are usually fed by a corresponding number of high frequency inverters.

Having a larger number of electrical loads translates into a system cost significantly higher than conventional hobs; for that reason, the market penetration of this kind of cooking hobs has been very low since its introduction about a decade ago.

One of the first patents related to "flexible induction cooktops" dates back to 1997 (WO1997037515A1). This document describes both the bi-dimensional array of induction cells and a user interface that allows clustering a number of cells together to energize a pot.

The subsequent state of the art, aimed at feeding high frequency current to a large number of induction coils, can be classified into two basic solutions: one solution consists in having as many inverters as the number of induction coils (as in EP2252130 mentioned above), and the second consists in having a lower number of inverters shared among multiple coils through a multiplexing network.

It is clear that the first solution is particularly expensive, as it requires a large number of micro-inverters, each endowed with all the necessary functions for the normal operation of an induction system (pan detection, closed loop PWM control, current protections, etc.). On the other hand, if the second solution enjoys a reduction in number of inverters, nevertheless it still needs an expensive and bulky network of static switches whose individual cost is sometimes similar to that of many micro-inverters.

The preferred embodiment according to the present invention falls within the above first class of solutions (plurality of microinverters).

EP2095686 discloses an induction cooking device circuit, with a set of inverters for generating a heating frequency and with at least one frequency processing unit for modifying at least one frequency of a signal, which is connected upstream of the inverters, wherein at least three inverters are assigned to the frequency processing unit. The frequency processing unit has a maximum power, which is configured to be lower than the power of the set of inverters. The vast majority of the induction cooktops commercialized before the filing date of such document were based on PCB assemblies made up of two inverters having power rating comprised between 2500 W and 3200 W each and a total rating of 3600 W.

EP2352359 discloses an induction hob having a plurality of induction heating elements, a control unit which is designed to operate a number of induction heating elements to heat at least one flexibly definable heating zone in a synchronized manner and a measurement array for measuring a heating power generated by the induction heating elements, the measurement array being designed to measure a sum of the heating powers of at least two induction heating elements, wherein the control unit is designed to use the sum of the heating powers to regulate the heating power, and wherein the control unit is also designed to operate a number of groups of induction heating elements simultaneously with an inverter in at least one operating state.

This document shows the solution of clusters of multiple inverters sharing the same (input) current measurement. However by the definition of measurement array, there must be multiple current measurement devices and the sum is to be performed afterwards. This would rule out the case of a single measurement device placed before the array of inverters.

US2010282740 discloses an array of inverters endowed with a common power measuring stage adapted to measure the sum of the power of all the individual inverters, when they operate in a synchronized manner.

As better explained in the following description, in the system according to the present invention a maximum of one inductor is preferably operating at any given moment for each sub-assembly of inductors. Therefore the synchronization of cells is not even definable within the sub-assembly. Moreover, in the technical solution according to the invention, the power measured is coinciding with the power of the only cell operating at any given moment (no summation can be defined if there are less than 2 addends).

WO2016/010492 A1 discloses a structure which presents similarities with the string of microinverters according to the present invention. However, there are several features in the disclosure which are missing in the system according to the present invention, namely the determination of a master inductor and the determination of a common switching frequency to be applicable to all the inductors of the induction cooking hob.

The object of the present invention is to provide an economically viable solution to realize an induction cooking hob mentioned at the beginning of the description, through an array of assemblies of micro-inverters, preferably of the quasi resonant type.

According to the invention, the above object is reached thanks to the features listed in the appended claims.

In the induction cooking hob according to the invention, the plurality of inductors (coils) and related inverters are divided in a number of predetermined assemblies, a control system being configured to carry out the method according to the present invention. In particular, the control system is configured to acquire or determine, on a periodic basis, the power vs. frequency curve, i.e., the power characteristic curves for each inductor coupled with a superposed cooking utensil in conjunction with its energizing inverter, and to select groups of inductors which allow a working condition at the same frequency in order to deliver a requested power to the cooking utensil. The induction cooking hob according to the invention is preferably organized as a number M, preferably comprised between 4 and 15, of identical physical electronic boards, hereinafter called "string of inverters".

Said groups of inductors are preferably energized so that they do not belong to the same assembly of coils, the assemblies of inductors being preferably independent assemblies of coils arranged in rows and/or columns, wherein each assembly is preferably provided with its own controller 14.

Further technical advantages according to the invention are as follows. Preferably, one inductor (16) of each assembly (10) is activated at a time. This avoids noise/beating problems within each string and allows the use of a single current sensor.

It is known that the typical maximum average power density of induction coils is comprised from 7 to 10 W/cm^2. According to the present invention, it is proposed that the average power of the inductors will be also comprised from 7 to 10 W/cm$^2$. However, the peak power is to be comprised from 2 to 8 times the maximum average power settable as target power for the inductor, preferably from 3 to 6 times said maximum average heating power.

Preferably, each inductor (16) has a peak power in the range between 1200 W and 2000 W, preferably about 1500 W.

For a coil of a preferred diameter of 80 mm, such design criteria would result in a maximum average power of $P_{max\_avg}=500$ W and a peak power $P_{peak}=1500$ W, which is 3 times $P_{max\_avg}$.

Since the peak power of each coil is designed to be comprised between 2 8 times, preferably from 3 to 6 times of its average power, this means that each coil is switched off for about ⅔ of the control period and this allows a coil construction with a low number of turns, which results in a coil which is much simpler to be assembled.

Another advantage of the present invention is that a plurality of inductors may be activated simultaneously although they do not necessarily relate to the same cooking utensil, which results in a much higher probability of finding a set of inductors sharing the same operating frequency range.

According to the invention, the above objects are reached thanks to the features listed in the appended claims.

SUMMARY OF THE INVENTION

According to one aspect of the disclosure, a method for operating an induction cooking hob comprising a plurality of inductors in association with induction resonant inverters is disclosed. The method comprises operating in load-dependent frequency ranges. Each of the inverters are supplied by a common rectifying circuit forming a multi-zone induction heating cooker. The method further comprises activating the inductors simultaneously, in at least one phase of a control period. The simultaneous activation is independent from an association of the inductors to an overlying cooking utensil and according to an at least partial overlapping of the associated operating frequency ranges of the inductors.

According to another aspect of the disclosure, an induction cooking hob comprising a plurality of inductors is disclosed. Each of the inductors is associated with an induction resonant inverter and supplied by a common rectifying circuit forming a multi-zone induction heating cooker comprising a control system configured to drive said inductors. The plurality of inductors and the related induction resonant inverters are divided in predetermined assemblies. The control system is configured to determine a plurality of power vs. frequency curves and an associated operating frequency range for each inductor coupled with a superimposed cooking utensil. The control system is further configured to sequentially select a plurality of groups of the inductors. The groups of the inductors are controlled at the same frequency delivering a requested power or energy to the superimposed coking utensil.

These and other aspects, objects, and features of the present invention will be understood and appreciated by those skilled in the art upon studying the following specification, claims, and appended drawings.

BRIEF DESCRIPTION OF THE DRAWINGS

Further advantages and features according to the present invention will be clear from the following detailed description, provided as a not limiting example, with reference to the attached drawings in which.

DETAILED DESCRIPTION

With reference to the drawings, an induction cooking hob according to the invention comprises a plurality of assemblies in the form of strings or assembly 10 preferably of quasi resonant inverters 12 or micro-inverters.

Quasi resonant inverters, also known as single ended resonant inverters, are known to have the lowest part count of any other resonant inverter topology, requiring only one resonant capacitor, and one solid state switch per controlled inductor. The drawback of such topology is that its operating frequency range is typically narrow, i.e. the ratio between the maximum and minimum frequency of the admissible operating range is lower than 2, and is load dependent. When narrow operating frequency ranges are present, the options of operating two or more inverters simultaneously, in particular at the same frequency, are reduced because the related operating frequency ranges can be slightly overlapping or not overlapping at all.

However, the method, according to the present invention, can also be applied to the flexible induction cooking hob provided with other or even mixed topologies of inverters.

In the disclosed embodiment, each string or assembly 10 comprises a microcontroller 14 configured to independently drive each of the inverters thereby providing excitation signals to the energizing inverters in conjunction with one or more associated coils 16.

Referring now to FIGS. 1, 2, 3, and 4, in a flexible induction hob, the total number of inductors 16 is typically greater than 12. In a preferred embodiment of the present invention, the size of at least some of the coils 16 is lower than the size of usual cooking utensils (pot, casseroles . . . ). In another preferred embodiment of the present invention, each inverter is connectable to only one inductor 16. The controller 14 is further in communication with a plurality of thermistors (not shown) configured to detect a temperature of each heating zone 18 of each induction coil 16. The string or assembly 10 further comprises a DC bus capacitor 19 and an input current sensor 21. In this configuration, the microcontroller 14 may be configured to independently activate and monitor each of the heating zones 18.

Figure 2:
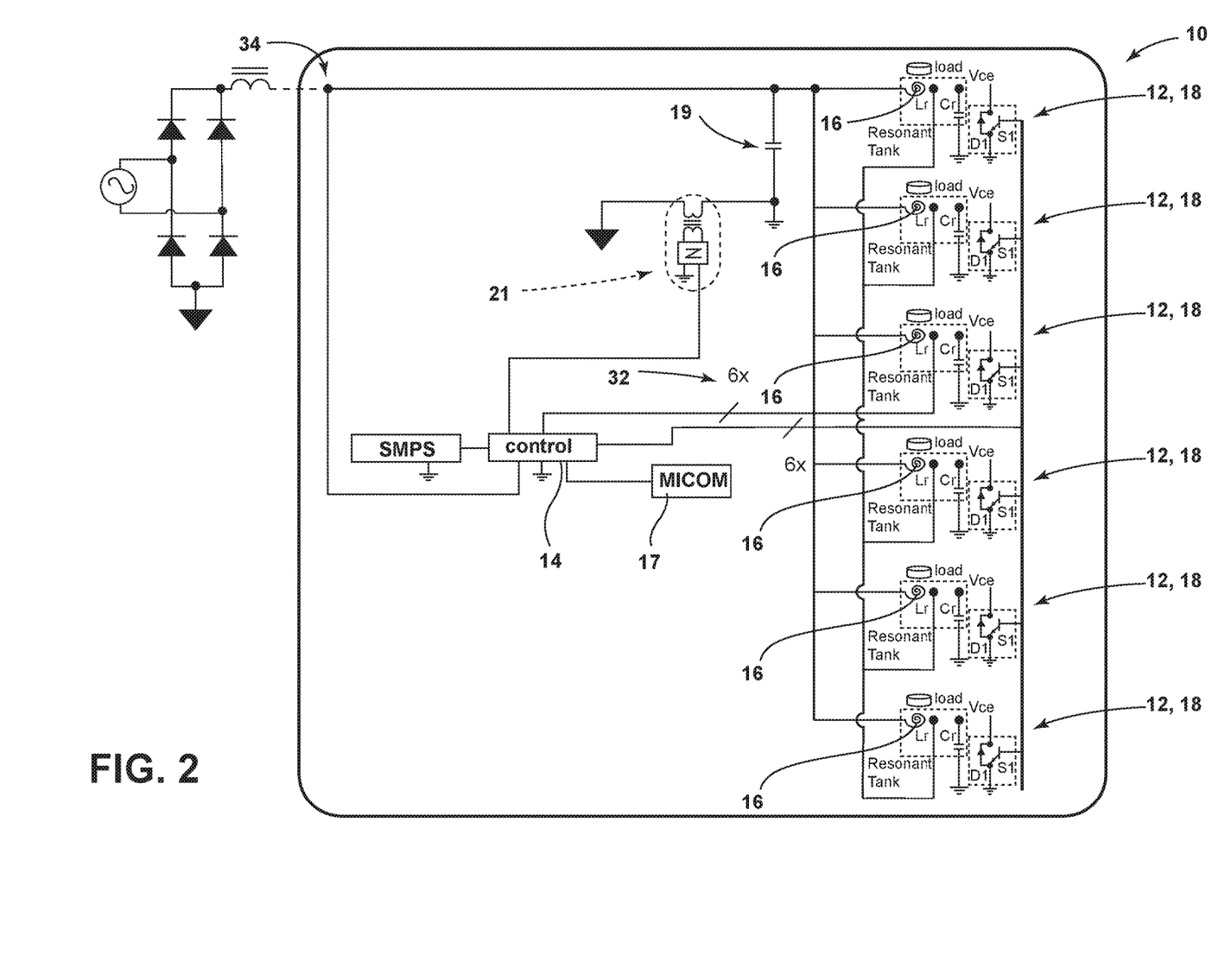
FIG. 2 shows an electronic architecture of a string of quasi resonant inverters coupled to an equivalent number of inductors in an induction cooktop according to the invention, where a bridge rectifier is common among multiple strings.

The microcontroller 14 comprises a plurality of gate drivers (not shown) and a plurality of Vce monitors 32 corresponding to each of the inverters 12. In this configuration, the microcontroller 14 may control the inverters 12 independently and monitor the operation of inverters 12 via the Vce monitors 32 and the input current sensor 21. As illustrated, the string 10 comprises N inverters 12 configured to independently control N induction coils 16. By combining a number M of the strings 10 together, a total of M×N induction coils can be controlled by the microcontrollers 14. Each of the string 10 comprises also a digital communication port 17.

In order to save costs, each of the inverters 12 of one string 10 may share the same DC-bus capacitor 19, the same input current monitor 21 and the same microcontroller 14 (preferably of the type of microcontroller, DSP, microcomputer or the like).

Each of the N inverters arranged within a string 10 is designed to supply an average power of up to 500 W and a peak power preferably comprised between 2 and 8 times the average power, more preferably 3 times the average power. Thanks to that dimensioning, each inductor and each inverter will operate with a maximum duty cycle equal to the ratio between the average power and the peak power (i.e. ½ to ⅛). This will allow each string 10 to preferably operate with no more than one energized inductor at any time, thus inherently avoiding any acoustic beating phenomena within a string. Moreover, having no more than one active inductor per string 10 at any time has the consequence that the input current measurement unambiguously refers to the sole cell active at that time, thus simplifying the power control.

The associated inductors are to be designed with the same criteria.

Of course if more than one inductor 16 has to be activated for one string 10 at the same time, such inductors have to work at the same frequency for the same above reason.

Each string 10 should conveniently drive one row or one column of adjacent inductors 16, but in general other combinations of not adjacent inductors could be envisaged (for instance circular crowns pattern).

Figure 3:
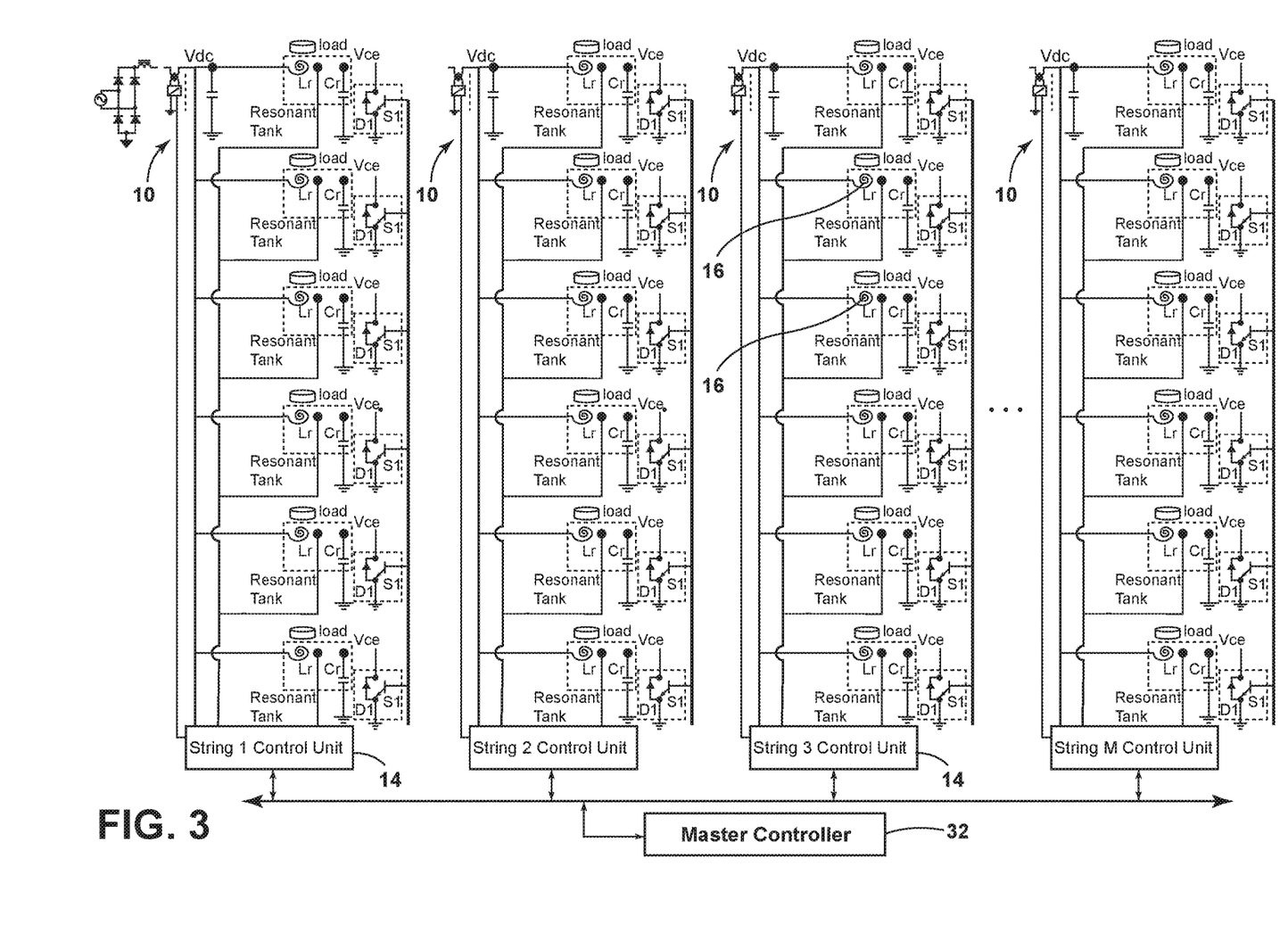
FIG. 3 is an array of strings of microinverters according to the invention.

By combining a number M of strings 10 together, a total of M×N induction coils 16 can be supplied by high frequency current, as shown in FIG. 3, for the case of M strings, each driving up to N=6 inductors 16.

Another advantage in designing an inductor having large peak power with respect to the average power is that its impedance can be much lower, resulting in a much smaller number of turns. A small number of turns has two advantages: a lower amount of copper and fewer layers are needed to accommodate the windings, resulting in lower eddy currents within the copper and consequently much higher electrical efficiency.

In the case where a cooking vessel lies over a number of cells supplied by different strings, it could be necessary that multiple cells fed by different strings are to be active at the same time. In a preferred embodiment of the present invention, the maximum number of inductors (16) simultaneously energized does not exceed the number of three. This configuration becomes particularly efficient for balancing the power absorption in flexible induction hobs supplied by means of a two or three phase power supply line.

In order to prevent audible noise, it is then necessary to synchronize the operating frequencies between the strings 10. In particular, when inductors belonging to different assemblies (10) are activated simultaneously, a synchronization among controllers of said assemblies (10) has to preferably be performed. Therefore each of the M digital controllers 14 are endowed with the digital communication port 17 to support the synchronization among the strings 10.

The synchronization could be advantageously put in place whenever adjacent strings 10 are active simultaneously but not performed otherwise.

According to the present invention, the method of operating a flexible induction cooking hob comprising a plurality of inductors 16 distributed next to each other to form a bi-dimensional array, said inductors 16 being energizable by inverters 12, said inductors 16 being overlaid by a common cooking utensil or by different cooking utensils, comprises the following steps:

obtaining for each of said plurality of inductors 16 a target energy or a target power to be delivered;

acquiring for each of said inductors 16 in conjunction with its energizing inverter 12, a power vs. frequency curve;

defining a predetermined control Tprog period shorter than a thermal time constants of at least one of said cooking utensils, and longer than one half-period of the mains;

establishing for each of said inductors 16, in conjunction with its energizing inverter 12, an operating frequency range associated to said power vs. frequency curve;

establishing an activation sequence of said inverters 12 in which each of said inductors 16 can be energized alone and/or in combination with at least a second inductor of said plurality of inductors 16, in order that each single inductor 16 is able to deliver said target energy, or said target power on average, over said control period Tprog, said combination of inductors being selected irrespectively of whether said each of said inductors 16 and said at least second inductor are overlaid by the common cooking utensil or by different cooking utensils, and wherein said each of said inductors 16 and said at least second inductor are provided with respective operating frequency ranges at least partially overlapping, wherein said activation sequence has duration corresponding to said control period Tprog; and activating said inverters 12 according to said activation sequence.

In order to coordinate the staggered activation of each coil 16 within each string 10, the cooktop presents a master controller 32 that collects the electrical characteristics of each coil 16 associated to the inverters 12 and, based on that information, it computes an activation sequence of predetermined duration $T_{prog}$.

By activation sequence we mean a data structure representing the switching sequence of each of the interested coil 16, at each mains semi-period, over the duration $T_{prog}$ of the sequence.

By electrical characteristics of each coil 16, we mean the coil complex impedance vs. frequency or the power vs. frequency curve and the admissible range of operating frequencies of each inverter coupled with its coil and covered by a particular cooking utensil. It is therefore clear that when we refer to power vs. frequency curves we also mean complex impedance vs. frequency of vs. period as well.

The communication between the master controller 32 and the string control unit 14 is preferably implemented by a bidirectional communication bus. The communication bus will include the synchronization line mentioned before.

The synchronization among different strings (assemblies) 10 will be preferably designed to align both frequency and phase.

Preferably, the second inductor (16) belongs to another different inverter assembly (10).

The activation sequence which is part of the invention, will be computed and will be preferably subject to the following functional constraints:

1. For every mains semi-cycle, each coil 16 will be either idle (off) or operating at a common frequency, equal for every cell being active in that mains semi-cycle;
2. Preferably no more than one cell/micro-inverter is to be active, at any given time per each string 10;
3. The average power delivered to each cell, averaged over $T_{prog}$, must be equal to its desired set point.

The master controller 32 can be either one discrete and distinct controller with respect to the M string controllers or one of the M string controllers 14 could be advantageously designated to perform the duties of the master controller.

In a two phases or three phases mains power supply system, the M strings could be advantageously split into 2 or 3 groups in order to balance the power across the phases. For instance, an eight string cooktop rated for a maximum power of 7200 W at 230V could be advantageously split into two groups of four strings, each group rated at a total power of 3600 W and each connected to a different mains phase.

Each group of strings will have one voltage rectifier, common to all the strings 10 connected to the same mains phase. Thanks to the common voltage rectifier, whenever at least one converter among all the converters attached to that particular phase is delivering power to at least one coil 16, the voltage across each of the DC-bus capacitors 19 will preferably be discharged to near zero volts at every mains zero crossing, resulting in the beneficial effect of allowing the possibility to soft-start any of the inverters at the next mains semi-cycle, owing to the reduced bus capacitors Voltage in the vicinity of the mains zero crossing. More in general, in a preferred embodiment of the present invention, inverters are activated or deactivated in the vicinity of mains zero crossing.

As far as the power control is concerned, considering the possibility of having an arbitrary number K of pots placed on the cooking surface, each covering an arbitrary number of cells or inductors 16, the following preliminary steps will be performed in an induction cooktop according to the invention:

1) Determine K clusters of cells, each cluster corresponding to a different cooking utensil (not shown);
2) Receive K power set-points (also referred as target power $PP_1, PP_2, \ldots, PP_K$) to be assigned to each cooking utensil.
3) The power level assigned to at least one of said cooking utensils is distributed among the respective underlying inductors (16), thereby assigning to each cell an individual power set-point. This could be performed, for instance, by dividing the pot setpoint ($PP_x$) to the number of cells (inductors) covered by that particular pot. This will result in having a power set-point (power target PC11, PC12 . . . PCMN) assigned to each cell inductor n the system.
4) For every cell in the system covered by at least one pot, in conjunction with its energizing inverter, acquire the power vs. frequency curve and establish the frequency operating range associated with said power vs. frequency curve, which is admissible for the use.

Other power set-points (targets) allocation criteria are possible: for instance, a lower power could be delivered to the inner cells 16, or a power set point could be allocated based on the pot coverage factor. As far as the control method according to the invention is concerned, the power set-point allocation criteria are not relevant.

Figure 4:
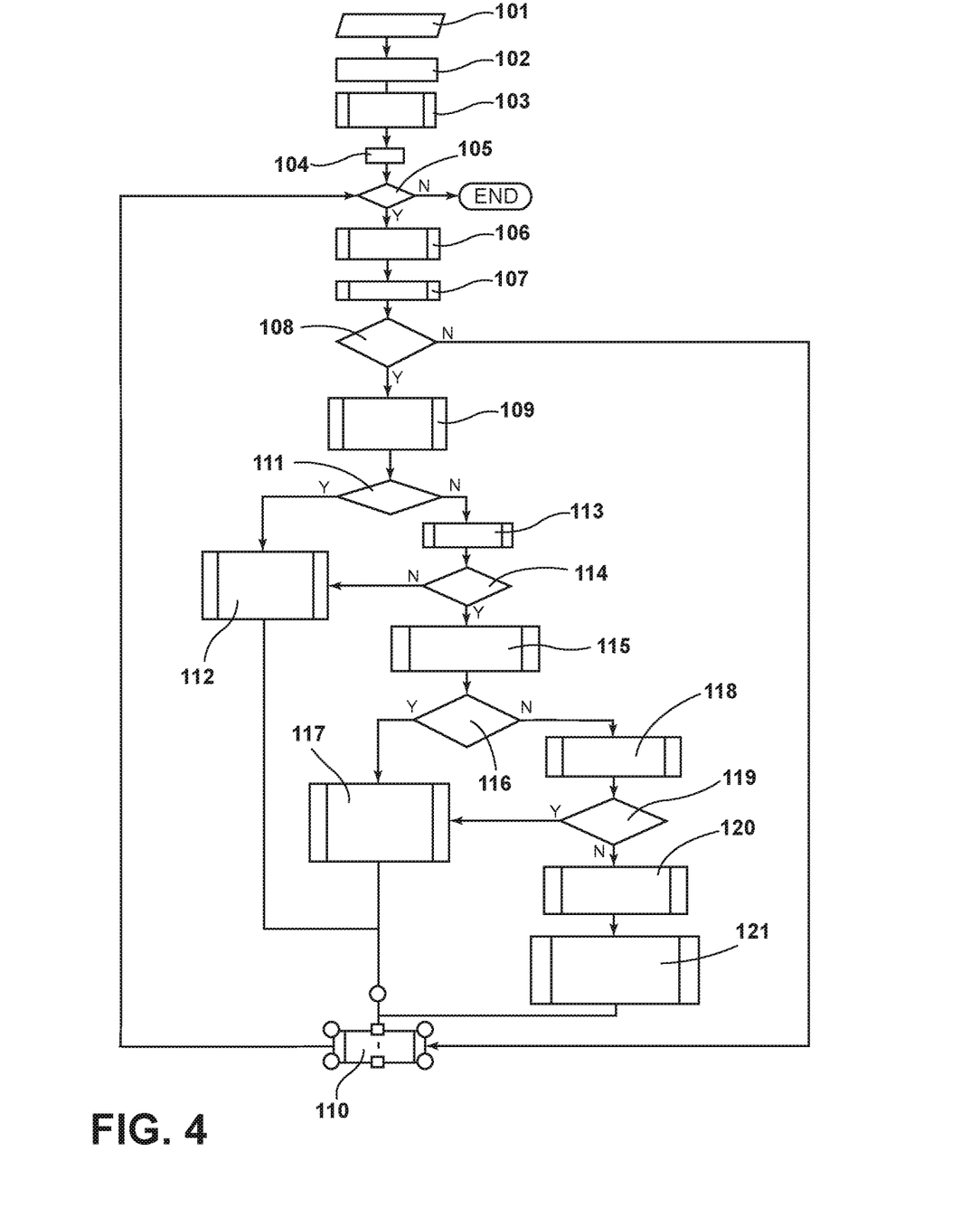
FIG. 4 is a flowchart showing an "energy token" allocation algorithm according to the invention.

After these preliminary steps, the master controller 32 will perform the "energy token" allocation algorithm (i.e., an activation sequence), described in FIG. 4. This algorithm includes the task of defining a cell activation sequence, hereinafter called the "song", which fulfils the functional constraints described before. The song defines the activation state of each cell/microinverter, at each mains semi-period and has a previously defined duration $T_{prog}$, equal to an integer number of mains semi-periods. A preferred value for Tprog is shorter than the thermal time constants of at least one of the cooking utensils overlying the inductors, and longer than one half period of the mains. An integer number Nprog represents the index of the current page of the song, with respect to the duration of the song. Nprog, can be conveniently set as an odd number of mains semi-waves preferably comprised from 51 to 501. A preferred value for Nprog is 101. Therefore, Tprog is equal to the product of the duration on a mains semi-period and Nprog.

Once the energy token allocation has been performed, a valid "song" is available to be "played" by each string controller 14. Then, the master controller 32 sends to each of the string controllers 14 the corresponding sub-song, via the communication bus.

When each string controller 14 has received its own sub-song, the system can start the execution of the song, in a synchronized way, starting from the first page. When the last page is over (i.e. N=Nprog), the song is repeated again, starting from the first page.

In a preferred embodiment, the system reacquires periodically the power vs. frequency curve for each inductor (or coil) 16 coupled with a superposed cooking utensil in conjunction with its energizing inverter, and then recalculates a new song, using the new power vs. frequency curves (named also as load curves).

In order to manage load variations, caused by external factors, such as mains line swells or surges or sudden pot movement, each individual string controller 14 has the faculty to momentarily deviate from the currently valid song, for instance by skipping one or more pages. Should this happen, the string controller will notify the master controller 32 of the exception, thus triggering an appropriate action. In a preferred embodiment, the appropriate action will be to wait until a stable electrical condition is reached and then the system reacquires a fresh set of power vs. frequency curves and then applies the energy token allocation algorithm again.

According to a preferred embodiment of the present invention the method further comprises the step of estimating, a residual energy or a residual power to be delivered by the said at least one of said inductors 16, and using in the activation sequence such residual energy or said residual power respectively as the target energy or as the target power to be delivered during at least a second fraction of the control period Tprog other than the first fraction.

In particular, it would be preferred that the step of establishing an activation sequence of said resonant inverters 12 includes selecting the inductor from the plurality of said inductors 16 as a function of said residual energy or residual power and/or as a function of a number of said second inductors provided with respective operating frequency ranges at least partially overlapping with the frequency range of the said inductor.

With reference to the algorithm of FIG. 4, the first step 101 is used to define both the set power of each single cell and the characteristic curve power vs. frequency for each cell:

get $Pc=[Pc_{11}, Pc_{12}, \ldots, Pc_{MN}]$ wherein $Pc_{ij}$ is the set power for each cell;

get $P_{11}(f), P_{12}(f), \ldots, P_{NM}(f)$ wherein $P_{ij}(f)$ is the power vs. frequency curve for each cell.

Then in step 102 the overall average Power is determined as:

$Pave = \Sigma Pr_{ij}$

In step 103 the energy residual matrix is initialized:

$Er(i,j) = Pc_{ij} * Tprog$ where $Er(i,j)$ is the energy that each cell i,j has to deliver in the time Tprog with a power $Pr(i,j)$.

At time 0 the total delivered Energy is initialized:

$Etot(0) = 0$

Thus, given the power request $Pr(i,j)$ for the cell $(i,j)$, the energy residual matrix is initialized as $Er(i,j) = Pr(i,j) * Tprog$ wherein Tprog is the duration of a control period.

In step 104 the cycle timing is initialized with T=0.

In the comparison step 105 it is assessed whether the total time T is Tprog. If it is higher the program ends for a Tprog, if it is shorter, then in step 106 the desired power Pdes(T) which has to be delivered in the interval T is found as:

$Pdes(T) = Pave*(T+1) - Etot$

This is the power that has to be delivered at the interval T in order to satisfy the power request for all coils 16 in the control period of length Tprog.

In the subsequent step 107 the most critical cell is identified as:

$mc = (mc_i, mc_j)$ wherein such cell is preferably selected as a function of at least the energy debt and the number of other inductors whose operating frequency ranges at least partially overlap with that of the cell itself. The energy debt of a cell 16 is a weighted sum of absolute energy error $Er(i,j,T)$ and relative energy error $Er(i,j,T)/Er(i,j,0)$ at any given moment T over the course of Tprog. $Er(i,j;T)$ is the energy residual for the cell $(i,j)$ at the interval T of the control period. In one embodiment, the most critical cell is identified as the one with the largest energy debt. In another embodiment, the most critical cell is identified as the one where the ratio between energy debt and number of "friends" is larger. With the term "friend" we mean another cell (inductor) 16 belonging to the same or to another string (assembly) 10 whose frequency range has at least one point in common with the cell, i.e. the cells must be energizable, in at least a first fraction of the control period Tprog, simultaneously at a common operating frequency. In order to be a "friend", a cell must have a positive (non-zero) residual energy to be delivered. Moreover a friend of a cell should be activated together with the cell, preferably without exceeding the power limit.

In the following comparison step 108 it is assessed whether the most critical cell mc has a positive energy residual. If the assessment is negative, then there are no cells left with positive energy residual and therefore it is necessary to wait for the end of the control period (step 110).

If the above assessment is positive, a frequency $f_1$ is found such that the power delivered by mc at $f_1$, i.e. $P_1 = P(mc, f_1)$, is as close as possible to Pdes(T).

In the subsequent comparison step 111 it is assessed whether the above power delivered by the most critical cell is overpassing Pdes by considering a certain small tolerance Ptol, of the order of 50 W:

$P_1 >= Pdes - Ptol$

If the result of such comparison is positive, then in step 112 the most critical cell mc is activated alone at frequency $f_1$ to deliver power $P_1$. In step 112 residual energy matrix is updated:

$Er(mc) = Er(mc) - P(mc, f_1) * MSP$ and total energy delivered is updated:

$Etot = Etot + P_1$

If the result of the comparison in step 111 is negative, then in this case the most critical cell needs the help of a "friend" to deliver the required desired power.

Therefore in step 113 the first most critical friend mcf is identified:

$mcf = (mcf1\_i, mcf1\_j)$

In the check step 114 it is assessed whether a least a common friend exists. If this condition is not verified, then the most critical cell has no other chance than doing the job alone (step 112). In the affirmative, in step 115 frequency $f_2$ is found such that the total power delivered by the two cells at $f_2$ is:

$P_2 = P(mc, f_2) + P(mcf, f_2)$ and is as close as possible to P_des.

Of course in step 115 the minimum frequency must also fulfil the constraint of not exceeding the maximum Total Power.

In the subsequent comparison step 116 it is checked whether the power delivered by the two cells 16 $P_2$ is higher than Pdes by considering a certain small tolerance Ptol, of the order of 50 W (as in step 111):

$P_2 >= Pdes - Ptol$

In the affirmative, the most critical cell does not need another friend to deliver the average power; in this case in step 117 the following actions are performed:

activate the most critical cell mc together with the most critical friend mc_f at frequency $f_2$ to deliver a total power $P_2$;

update residual energy matrix $Er(mc) = Er(mc) - P(mc, f_2)$ $Er(mcf) = Er(mcf) - P(mcf, f_2)$ and update total energy delivered:

$E_{tot} = E_{tot(-1)} Etot + P_2$

If in step 116 $P_2<Pdes-Ptol$, then in this case the most critical cell 16 needs to search for a third "friend" to deliver the average power. Therefore in step 118 the second most critical friend cf has to be identified (also friend of the first friend):

$$cf=(cf_{2,i},cf_{2,j})$$

If in the check step 119 a common second friend exists, then in step 120 a frequency $f_3$ is found such that the total power delivered by mc, mcf, and cf is as follows:

$$P_3=P(mc,f_3)+P(mcf,f_3)+P(cf,f_3)$$

and it is as close as possible to Pdes.

If in step 119 a common second friend is not found, then the most critical cell and the most critical friend has no other chance than doing the job by themselves, as shown in step 117.

Downstream step 120, in step 121 the three friend cells mc, mcf, and cf are activated altogether at frequency $f_3$ to deliver a total power $P_3$:

Update residual energy matrix $$Er(mc)=Er(mc)-P(mc,f_3)$$

$$Er(mcf)=Er(mcf)-P(mcf,f_3)$$

$$Er(cf)=Er(cf)-P(mcf,f_3)$$

Update total energy delivered:

$$Etot=+P_3$$

In step 110 cycle time is updated for starting a new iteration at step 105 for a subsequent mains semi period.

The peculiarity of the proposed method is that, at every instant of the control period, a plurality of inductors may be activated simultaneously irrespectively from their association to an overlying cooking utensil, i.e. irrespective of whether the inductors are overlaid by a common cooking utensil or by different cooking utensils, but only according to the at least partial overlapping of the associated operating frequency ranges.

Another peculiarity of the proposed method is that the number of cells being active simultaneously at every time instant is not larger than 3 per each mains phase, owing to the particular power sizing of each cell in excess of 1500 W. This results in a much larger probability of finding triplets of cells having common operating frequency range with respect to the case of larger clusters. This way, there is a much larger probability of complying with the Electromagnetic Interference requirements and avoiding audible noise when operating the hob.

Of course the algorithm described above with reference to FIG. 4 is only an example and can be designed in a different way or may comprise some variants, in particular one or more of the specific options described in the above, without departing from the solution according to the invention.

For instance, instead of considering friend of a cell only, it is possible to use also a "brother" of a cell where two or more cell 16 of a single string 10 can be activated at the same time. In this regard a brother of a cell is another cell belonging to the same string 10, whose frequency range has at least one point in common with the cell.

What is claimed is:

1. A method for operating a flexible induction cooking hob comprising a plurality of inductors distributed next to each other to form a bi-dimensional array, said inductors being energizable by a plurality of inverters, a number of said plurality of inductors being underlying inductors overlaid by at least one cooking utensil comprising a common cooking utensil or different cooking utensils, wherein the method comprises the following steps:

assigning a power target value to the at least one cooking utensil, wherein the target power value is distributed among the underlying inductors of plurality of inductors;

obtaining for each of said underlying inductors a target energy or a target power to be delivered;

acquiring for each of said underlying inductors and the one of the inverters configured to energize each of said underlying inductors, a power vs. frequency curve;

defining a predetermined control (Tprog) period shorter than a thermal time constant of at least one of said cooking utensils, and longer than one half-period of a mains power supply;

establishing for each of said underlying inductors, in conjunction with its energizing inverter, a respective operating frequency range defined by said power vs. frequency curve; and establishing an activation sequence of said inverters in which each of said underlying inductors is configured to be energized with at least a second inductor of said plurality of inductors forming a combination of inductors, wherein:

each of said underlying inductors is configured to deliver said target energy or said target power on average over said control period (Tprog), said combination of inductor is selected irrespectively of whether each of said underlying inductors, and at least the second inductor are overlaid by the at least one cooking utensil, each of said underlying inductors and at least said second inductor are provided with the respective operating frequency range, at least partially overlapping, and said activation sequence has a duration corresponding to said control period (Tprog); and activating said inverters according to said activation sequence.

2. The method according to claim 1, wherein each of said underlying inductors is configured to be energized in combination with at least the second inductor, and said at least the second inductor belongs to a different inverter assembly than an inverter assembly of each of said underlying inductors.

3. The method according to claim 2, wherein one inductor of the plurality of inductors of each of the inverter assemblies is activated at a time.

4. The method according to claim 2, wherein a synchronization among plurality of controllers of said assemblies is performed, such that the underlying inductors belonging to different assemblies are activated simultaneously.

5. The method according to claim 1, wherein the step of establishing an activation sequence of said inverters includes establishing to energize simultaneously each of the underlying inductors and the said at least a second inductor, at a common operating frequency and during at least a first fraction of the control period (Tprog).

6. The method according to claim 5, further comprising the step of estimating, a residual energy or a residual power to be delivered by said at least one of said underlying inductors, and using in the activation sequence such residual energy or said residual power respectively as the target energy or as the target power to be delivered during at least a second fraction of the control period (Tprog) other than said first fraction.

7. The method according to claim 6, wherein the step of establishing an activation sequence of said inverters includes selecting each of said underlying inductors from the plurality of said inductors as a function of said residual energy or residual power or as a function of a number of said second inductors provided with respective operating frequency ranges at least partially overlapping with the frequency range of each of said underlying inductors.

8. The method according to claim 1, wherein a maximum number of the underlying inductors simultaneously energized does not exceed the number of three.

9. The method according to claim 1, wherein the step of acquiring power vs. frequency curves of each inductor is carried out periodically.

10. The method according to claim 1, wherein the inverters are resonant inverters or quasi resonant inverters, activated or deactivated in the vicinity of a zero crossing of the mains power supply.

11. The method according to claim 1, wherein the plurality of inductors is a number of inductors greater than 12.

12. The method according to claim 1, wherein each inverter is connected to only one of the plurality of inductors.

13. The method according to claim 1, wherein at least one of said inductors in conjunction with a connected energizing inverter of the plurality of inverters is provided with an operating frequency range having a maximum frequency and a minimum frequency whose ratio between is lower than 2.

14. A flexible induction cooking hob comprising:
a plurality of inductors distributed next to each other to form a bi-dimensional array, a number of said plurality of inductors being underlying inductors overlaid by at least one cooking utensil comprising a common cooking utensil or different cooking utensils; said inductors being energizable by a plurality of inverters connected or connectable thereto, wherein the flexible induction hob is provided with a control system configured to:
assign a power target value to the at least one cooking utensil, wherein the target power value is distributed among the underlying inductors of plurality of inductors;
obtain for each of said underlying inductors a target energy or a target power to be delivered;
acquire for each of said underlying inductors and the one of the inverters configured to energize each of said underlying inductors, a power vs. frequency curve;
define a predetermined control period (Tprog) shorter than a thermal time constant of at least one of said cooking utensils, and longer than one half-period of a mains power supply;
establish for each of said underlying inductors, in conjunction with its energizing inverter, a respective operating frequency range defined by said power vs. frequency curve;
establish an activation sequence of said inverters in which each of said underlying inductors is configured to be energized with at least a second inductor of said plurality of inductors forming a combination of inductors,
each of said underlying inductors is configured to deliver said target energy, or said target power on average, over said control period (Tprog),
said combination of inductors is selected irrespectively of whether each of said underlying inductors and at least the second inductor are overlaid by the at least one cooking utensil,
each of said underlying inductors and at least the second inductor are provided with respective operating frequency ranges, at least partially overlapping, and
said activation sequence has a duration corresponding to said control period (Tprog); and
activate said inverters according to said activation sequence.

15. The flexible induction cooking hob according to claim 14, wherein the inductors of the plurality of inductors are arranged in independent assemblies of columns or rows, each assembly being provided with a controller.

16. The flexible induction cooking hob according to claim 14, wherein each inductor of the plurality of inductors has a peak power which is rated from 2 to 8 times a maximum average heating power settable as target power.

17. The flexible induction cooking hob according to claim 14, wherein each inductor of the plurality of inductors has a peak power between 1200 W and 2000 W.

* * * * *